US007961983B2

(12) United States Patent
Uyttendaele et al.

(10) Patent No.: US 7,961,983 B2
(45) Date of Patent: Jun. 14, 2011

(54) GENERATING GIGAPIXEL IMAGES (75) Inventors: Matthew Uyttendaele, Seattle, WA (US); Michael Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 894 days.

(21) Appl. No.: 11/779,871

(22) Filed: Jul. 18, 2007

(65) Prior Publication Data
US 2009/0022421 A1    Jan. 22, 2009

(51) Int. Cl.
G06K 9/00    (2006.01)
G06K 9/36    (2006.01)
G06K 9/32    (2006.01)

(52) U.S. Cl. .................. 382/294; 382/154; 382/284

(58) Field of Classification Search .......... 382/284, 382/154, 294
See application file for complete search history.

(56) References Cited

U.S. PATENT DOCUMENTS

| | | | |
|---|---|---|---|
| 5,818,977 A * | 10/1998 | Tansley | 382/294 |
| 6,943,831 B2 | 9/2002 | Gallagher et al. | |
| 7,106,913 B2 | 6/2003 | Castorina et al. | |
| 7,142,723 B2 | 6/2005 | Kang et al. | |
| 7,010,158 B2 * | 3/2006 | Cahill et al. | 382/154 |
| 7,239,757 B2 | 6/2006 | Kang et al. | |
| 7,084,905 B1 | 8/2006 | Nayar et al. | |
| 7,239,805 B2 | 8/2006 | Uyttendaele et al. | |
| 7,126,630 B1 * | 10/2006 | Lee et al. | 348/218.1 |
| 2004/0183941 A1 * | 9/2004 | McCutchen | 348/373 |
| 2005/0201616 A1 | 9/2005 | Malvar et al. | |
| 2005/0243176 A1 | 11/2005 | Wu et al. | |
| 2006/0177150 A1 * | 8/2006 | Uyttendaele et al. | 382/284 |
| 2007/0014470 A1 | 1/2007 | Sloan | |
| 2007/0025717 A1 | 2/2007 | Raskar et al. | |
| 2007/0188653 A1 * | 8/2007 | Pollock et al. | 348/373 |

OTHER PUBLICATIONS

Agarwala, A., M. Dontcheva, M. Agrawala, S. Drucker, A. Colburn, B. Curless, D. Salesin, and M. Cohen, Interactive digital photomontage, ACM Transactions on Graphics, 2004, vol. 23, No. 3, pp. 294-302.
Brown, M., R. Szeliski, S. Winder, Multi-image matching using multi-scale oriented patches, Proc. of the 2005 IEEE Comp. Soc. Conf. on Comp. Vision and Pattern Recognition (CVPR'05), 2005, pp. 510-517, vol. 1.
Burt, P. J., and E. H. Adelson, The laplacian pyramid as a compact image code, IEEE Trans. on Communications, Apr. 1983, pp. 532-540, vol. 31, No. 4, Apr. 1983.

(Continued)

Primary Examiner — Hadi Akhavannik
(74) Attorney, Agent, or Firm — Lyon & Harr, LLP; Richard T. Lyon (57) ABSTRACT A gigapixel image is generated from a set of images in raw format depicting different portions of a panoramic scene that has up to a full spherical field of view. Radiometric alignment of the images creates a set of images in radiance format. Geometric alignment of the radiance format images creates a set of true poses for the images in radiance format. A gigapixel image depicting the entire scene is assembled from the set of radiance format images and radiance format true poses for the images. The set of images in raw format is captured using a conventional digital camera, equipped with a telephoto lens, attached to a motorized head. The head is programmed to pan and tilt the camera in prescribed increments to individually capture the images at a plurality of exposures and with a prescribed overlap between images depicting adjacent portions of the scene.

19 Claims, 8 Drawing Sheets

OTHER PUBLICATIONS

Eden, A., M. Uyttendaele, R. Szeliski, Seamless image stitching of scenes with large motions and exposure differences, Proc. of the 2006 IEEE Comp. Soc. Conf. on Comp. Vision and Pattern Recognition, vol. 2, pp. 2498-2505.

Fischler, M. A., R. C. Bolles, Random sample consensus: a paradigm for model fitting with applications to image analysis and automated cartography, Communications of the ACM, 1981, pp. 381-395, vol. 24, No. 6.

Kopf, J., M. Cohen, D. Lischinski and M. Uyttendaele, Joint bilateral upsampling, Proceedings ACM Transactions on Graphics, 2007, vol. 26, No. 3.

Lam, K. M., Metamerism and colour constancy, PhD thesis, University of Bradford, 1995.

Lischinski, D., Z. Farbman, M. Uyttendaele, and R. Szeliski, Interactive local adjustment of tonal values, ACM Trans. on Graphics (TOG), Jul. 2006, pp. 646-653, vol. 25, No. 3.

Lowe, D., Distinctive image features from scale-invariant keypoints, Int'l J. of Comp. Vision, 2004, vol. 60, pp. 91-110.

Pérez, P., M. Gangnet, and A. Blake, Poisson image editing, ACM Trans. on Graphics (SIGGRAPH'03), pp. 313-318, vol. 2, No. 3.

Xiao, F., J. E. Farrell, J. M. DiCarlo, and B. A. Wandell, Preferred color spaces for white balancing, Proc. Soc. of Photo-Optical Instrumentation Engineers, 2003, pp. 342-350, vol. 5017.

Debevec, P. E., J. Malik, Recovering high dynamic range radiance maps from photographs, Proc. of the 24th Annual Conf. on Comp. Graphics and Interactive Techniques, Aug. 1997, pp. 369-378, ACM Press/Addison-Wesley Publishing Co., New York, NY, USA.

Grosch, T., Fast and robust high dynamic range image generation with camera and object movement, Proc. of Int'l Workshop on Vision, Modeling and Visualization, Nov. 2006, pp. 277-284, Aachen, Germany.

Schechner, Y. Y., S. K. Nayar, Generalized mosaicing: High dynamic range in a wide field of view, Int'l J. of Comp. Vision, 2003, vol. 53, No. 3, pp. 245-267, Kluwer Academic Publishers.

\* cited by examiner

GENERATING GIGAPIXEL IMAGES

BACKGROUND

An image is normally thought of as being a visible representation of a person, place or thing that can be printed in hard copy form or displayed on a display device such as a computer monitor screen, television screen, etc. (i.e. in "soft copy" form) and then viewed in its entirety in a single representation. However, recent advances in image capture technology, such as advances in camera systems and the ability to capture imagery from satellites, have resulted in the ability to capture imagery that has an ultra-high resolution of a billion or more pixels with a high dynamic range (HDR) and a related large field of view. Such imagery is herein referred to as a "gigapixel image."

Since the inception of the art of photography there has been a desire to capture images depicting a panoramic scene. Historically, a rotating slit scan camera was used to construct an image of a panoramic scene one vertical stripe at a time. Today, gigapixel images are often used to depict panoramic scenes. A number of techniques have been recently developed, in both the film domain and digital domain, for capturing gigapixel images with HDR. For example, in the film domain a custom-built, large film back camera system has been utilized. In the digital domain specialized digital panoramic camera systems exist which can be utilized to capture a set of digital images, each of which depicts a portion of a panoramic scene, which can be subsequently assembled into a composite panoramic image. In addition, in the digital domain satellite imagery of the earth can be used, where a set of digital images captured from satellites are subsequently assembled into a composite panoramic image.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

The present technique for generating gigapixel images generally involves using a computing device to generate the image from a set of captured images in raw pixel data format, where each captured image depicts a different portion of a panoramic scene. Radiometric alignment of the captured images creates a set of captured images in radiance pixel data format. Geometric alignment of the captured images creates a set of true poses for the captured images in radiance pixel data format. A seamless gigapixel image that depicts the entire panoramic scene is assembled from the set of captured images and the set of true poses for the captured images, all in radiance pixel data format.

The present technique also generally involves a system for capturing a set of images depicting a panoramic scene which has up to a spherical field of view. The system includes, but is not limited to, a conventional digital camera, equipped with a long telephoto lens, attached to a programmable motorized head. The aperture of the camera is set to a prescribed value which is based on a desired depth of field and the lens' modulation transfer function (MTF). The shutter speed of the camera is set by the camera's auto-exposure. The head is programmed to simultaneously pan and tilt the camera in prescribed increments over up to a 360 degree range in order to individually capture the set of images, where each image depicts a different portion of the panoramic scene. The images are captured in either vertical or horizontal scan-line order at a plurality of exposures and particular images that depict adjacent portions of the panoramic scene overlap each other by a common amount which is prescribed based on the pan and tilt positioning tolerances of the head.

It is noted that while the foregoing shortcomings and disadvantages of capturing and assembling gigapixel imagery described in the Background section can be resolved by a particular implementation of a technique for generating gigapixel images according to the present invention, the subject matter claimed hereafter is in no way limited to implementations that just solve any or all of the noted shortcomings and disadvantages. Rather, the present technique has a much wider application as will become evident from the descriptions to follow.

DESCRIPTION OF THE DRAWINGS

The specific features, aspects, and advantages of the present technique for generating gigapixel images will become better understood with regard to the following description, appended claims, and accompanying drawings where:

DETAILED DESCRIPTION

In the following description of embodiments of the present technique for generating gigapixel images reference is made to the accompanying drawings which form a part hereof, and in which are shown, by way of illustration, specific embodiments in which the present technique may be practiced. It is understood that other embodiments may be utilized and structural changes may be made without departing from the scope of the present technique.

It is noted that the term "resolution" as applied to an image is used herein to refer to the total number of distinct pixels that make up the overall image. As noted in the Background section, an image having an ultra-high resolution of a billion or more pixels with a high dynamic range (HDR) is herein referred to as a "gigapixel image." Gigapixel images are often used to depict panoramic scenes. It is also noted that the term "radiance pixel data" as applied to an image is used herein to refer to the amount of light captured by each pixel in the image.

1.0 Computing Environment

Before providing a description of embodiments of the present technique for generating gigapixel images, a brief, general description of a suitable computing system environment in which portions thereof may be implemented will be described. This environment provides the foundation for the operation of embodiments of the present technique which are described hereafter. The present technique is operational with numerous general purpose or special purpose computing system environments or configurations. Examples of well known computing systems, environments, and/or configurations that may be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 1:
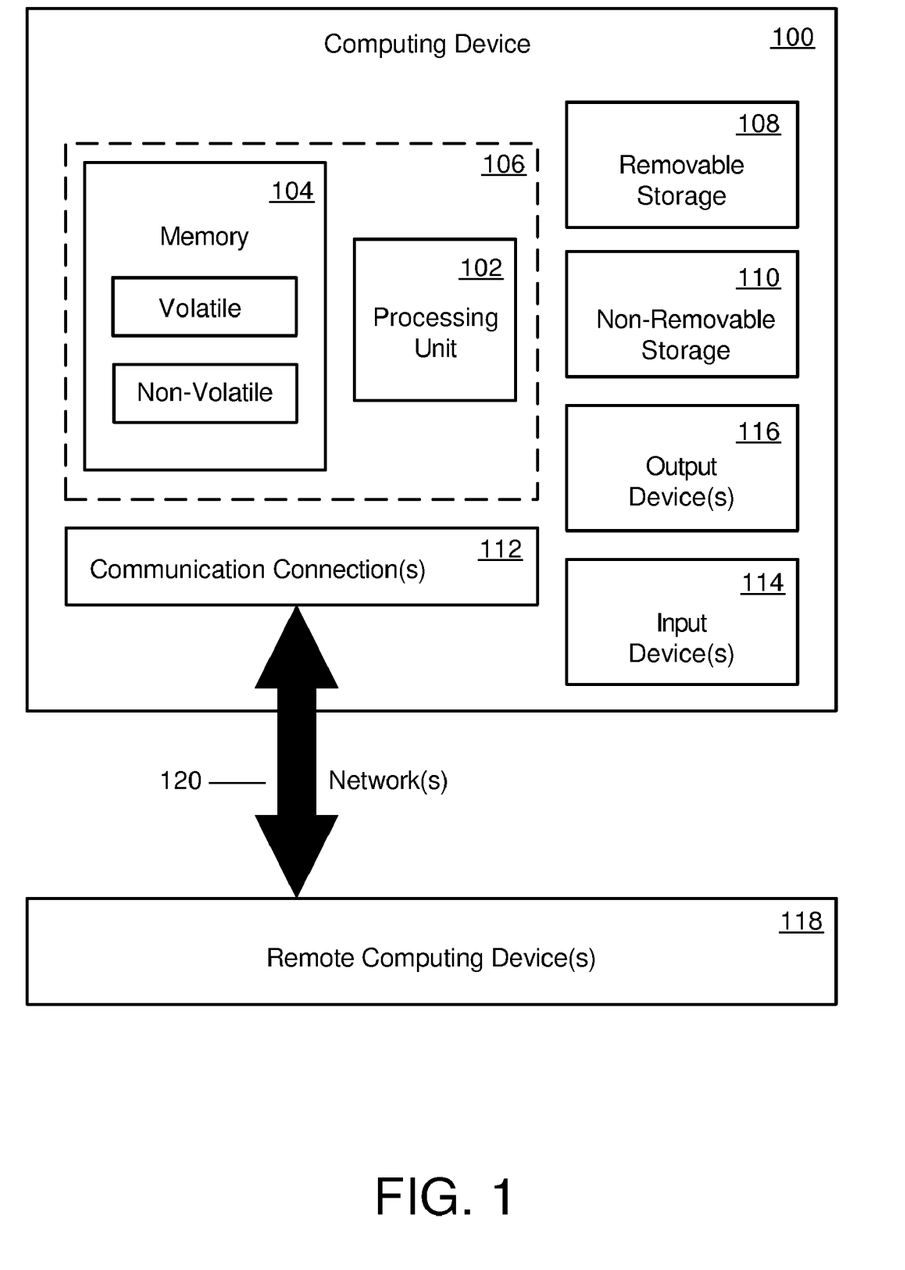
FIG. 1 shows a diagram of general purpose, network-based computing devices which constitute an exemplary system for implementing the present technique for generating gigapixel images.

FIG. 1 shows an exemplary suitable computing system environment. It is noted that the environment shown in FIG. 1 is only one example of a suitable computing system environment and is not intended to suggest any limitation as to the scope of use or functionality of the present technique. Neither should the computing system environment be interpreted as having any dependency or requirement relating to any one or combination of components shown in FIG. 1.

As shown in FIG. 1, an exemplary system for implementing the present technique includes one or more computing devices, such as computing device 100. In its most basic configuration, computing device 100 typically includes at least one processing unit 102 and memory 104. Depending on the specific configuration and type of computing device, the memory 104 may be volatile (such as RAM), non-volatile (such as ROM, flash memory, etc.) or some combination of the two. This most basic configuration is shown in FIG. 1 by dashed line 106.

As shown in FIG. 1, computing device 100 can also have additional features and functionality. For example, computing device 100 can include additional storage such as removable storage 108 and/or non-removable storage 110. This additional storage includes, but is not limited to, magnetic disks, optical disks and tape. Computer storage media includes volatile and non-volatile media, as well as removable and non-removable media implemented in any method or technology. The computer storage media provides for storage of various information required to operate the device 100 such as computer readable instructions associated with an operating system, application programs and other program modules, data structures, etc. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Any such computer storage media can be part of computing device 100.

As shown in FIG. 1, computing device 100 also includes a communications connection(s) 112 that allows the device to operate in a networked environment and communicate with a remote computing device(s), such as remote computing device(s) 118. Remote computing device(s) 118 can be a PC, a server, a router, a peer device or other common network node, and typically includes many or all of the elements described herein relative to computing device 100. Communication between computing devices takes place over a network(s) 120, which provides a logical connection(s) between the computing devices. The logical connection(s) can include one or more different types of networks including, but not limited to, a local area network(s) and wide area network (s). Such networking environments are commonplace in conventional offices, enterprise-wide computer networks, intranets and the Internet. It will be appreciated that the communications connection(s) 112 and related network(s) 120 discussed herein are exemplary and other means of establishing communication between the computing devices can be used.

As shown in FIG. 1, communications connection(s) 112 and related network(s) 120 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media. The term "computer readable media" as used herein includes both storage media and communication media.

As shown in FIG. 1, computing device 100 also includes an input device(s) 114 and output device(s) 116. Examples of an input device(s) 114 include, but are not limited to, a keyboard, mouse, pen, voice input device, touch input device, camera, etc. A user can enter commands and information into the computing device 100 through the input device(s) 114. Examples of an output device(s) 116 include, but are not limited to, a display device(s) via which the user can view images and other types of information, speakers, a printer, etc. With the exception of camera systems which are discussed hereafter, the rest of these input and output devices are well known in the art and need not be discussed at length here.

The present technique can be described in the general context of computer-executable instructions, such as program modules, which are executed by computing device 100. Generally, program modules include routines, programs, objects, components, data structures, etc. that perform particular tasks or implement particular abstract data types. The present technique can also be practiced in a distributed computing environment where tasks are performed by one or more remote computing devices 118 that are linked through a communications network 112/120. In a distributed computing environment, program modules may be located in both local and remote computer storage media including, but not limited to, memory 104 and storage devices 108/110.

An exemplary environment for the operation of embodiments of the present technique having now been discussed, the remainder of this Detailed Description section is devoted to a description of the camera system, procedures, and related processes and program modules that embody the present technique.

2.0 Generating Gigapixel Images

Figure 2:
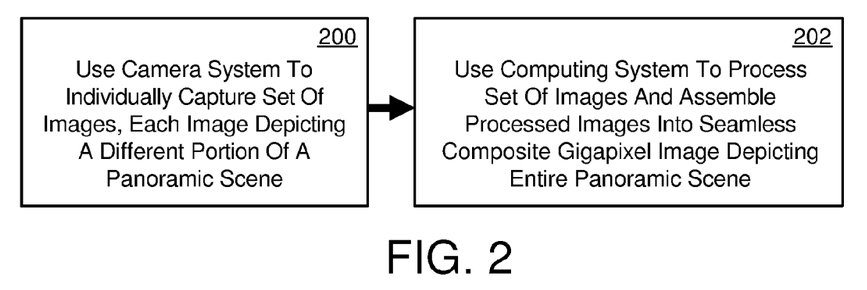
FIG. 2 shows a diagram of two stages generally involved in an exemplary embodiment of the present technique for generating gigapixel images.

As shown in FIG. 2, in an embodiment of the present technique for generating gigapixel images two stages are generally involved. The first stage generally involves using a camera system to individually capture a set of images where each image depicts a different portion of a panoramic scene 200. An exemplary camera system is described hereafter. The second stage generally involves using the aforementioned computing system to process the set of images and assemble the processed images into a seamless, composite gigapixel image that depicts the panoramic scene in its entirety 202. These two stages will now be described in detail.

2.1 Capturing Images of a Panoramic Scene

As discussed heretofore, various techniques for capturing images depicting a panoramic scene are known in the art of photography. This section describes embodiments of a camera system that was designed and used for individually capturing a set of images depicting a panoramic scene in tested embodiments of the present technique. The following requirements were developed and imposed on the design of the camera system:

(a) The camera system should use a mass produced, conventional digital camera in order to make it cost effective.
(b) The camera system should use a long telephoto zoom lens in order to optimize the resolution achieved for each captured image.
(c) The camera system should be capable of capturing a panoramic scene with a field of view perspective up to 360 degrees in all directions (i.e. up to a complete spherical field of view).
(d) The camera system should capture the set of images depicting the panoramic scene as fast as possible in order to minimize potential issues between images in a set such as registration issues due to elements in the scene which move over time, among other things, and illumination changes in the scene over time. As such, the camera system should have good physical stability and vibration damping characteristics in order to manage the payload of the camera/lens, and also to minimize and quickly damp any vibrations due to movement of the camera/lens about the field of view or other environment conditions including, but not limited to, wind.
(e) The camera system should capture the set of images on as regular and uniform a grid as possible in order to minimize the aforementioned image registration issues and hence, simplify the aforementioned processing and assembly of the set of captured images.
(f) The camera system should allow for wide variations in dynamic range across different portions of the panoramic scene.
(g) Each captured image should be as sharp as possible down to the pixel level in order to allow a user to interactively view the captured panorama during the capture process.
(h) The camera system should be capable of storing the captured set of images in their raw pixel data format and should record various capture parameters such as the exposure time for each image as part of the stored data for the image.

Figure 3:
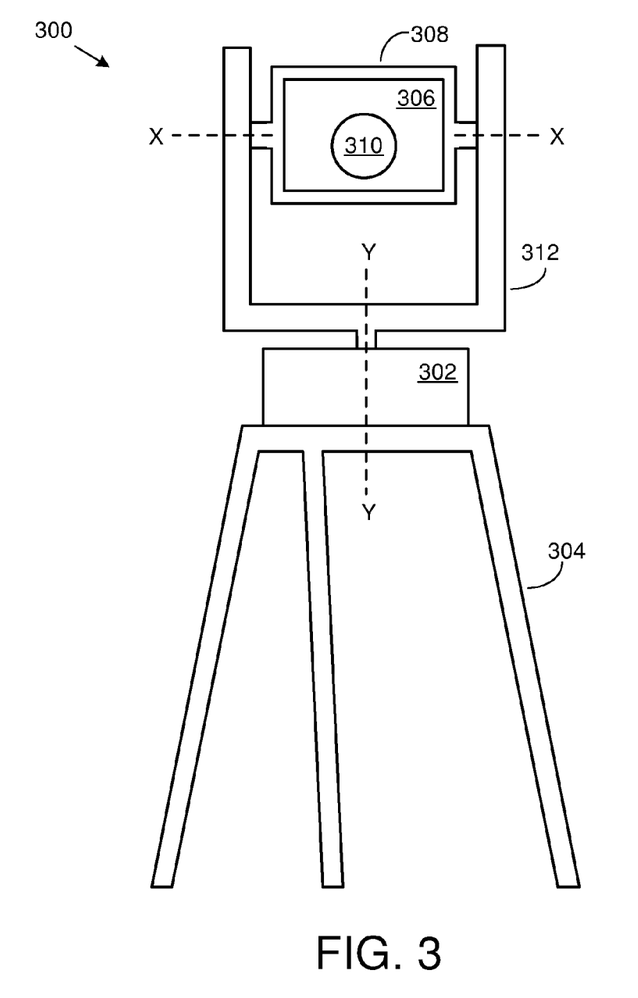
FIG. 3 shows a simplified front view of an exemplary embodiment of a camera system for individually capturing a set of images depicting a panoramic scene according to the present technique.

FIG. 3 shows a simplified front view of an embodiment of a camera system 300 used to individually capture sets of images depicting panoramic scenes in tested embodiments of the present technique. The camera system 300 generally consists of a programmable motorized head 302 which is rigidly attached to a conventional tripod stand 304. A U-shaped assembly 312 is movably attached to the motorized head 302. A camera 306 is movably attached to the U-shaped assembly 312 using a harness 308, where the camera is rigidly attached to the harness and the harness is movably attached to the U-shaped assembly. A lens 310 is rigidly attached to the camera 306. The motorized head 302 operates to rotate the U-shaped assembly 312, and correspondingly the harness 308/camera 306/lens 310 about the Y axis (also herein referred to as a vertical axis) in prescribed increments. In this manner, a 360 degree range of motion can be achieved about the Y axis. The particular angle of the camera 306 about the Y axis is hereinafter also referred to as a pan angle and rotation of the camera about the Y axis is referred to as pan positioning. The motorized head 302 also operates to rotate the harness 308/camera 306/lens 310 about the X axis (also herein referred to as a horizontal axis) in prescribed increments via a mechanical assembly contained within the U-shaped assembly 312 that operates under the control of the head. In this manner, a 360 degree range of motion can also be achieved about the X axis. The particular angle of the camera 306 about the X axis is hereinafter also referred to as a tilt angle and rotation of the camera about the X axis is referred to as tilt positioning. The combination of programmable motions about the X and Y axis thus meets requirement (c). It is noted that the radial distortion and vignetting associated with the particular lens 310 used in the camera system 300 are pre-characterized and this characterization is used during the aforementioned second stage of the present technique (refer to FIG. 2, stage 202).

Referring again to FIG. 3, in order to address the aforementioned requirements (a), (b) and (h), in tested embodiments of the present technique both a conventional Canon EOS-1Ds Mark II 16.7 megapixel digital single lens reflex (SLR) camera, and a conventional Canon EOS-20D 8.2 megapixel digital SLR camera, were employed as the camera 306, and a 100-400 mm zoom lens was employed as the lens 310. Custom software was designed for these cameras in order to control them. In order to address requirements (c)-(e), in tested embodiments of the present technique a conventional Meade® (a registered trademark of Meade Instruments Corporation) LX200R telescope mount was modified and employed as the motorized head 302. The modifications to the LX200R included the following. The optical tube assembly was removed from the LX200R and replaced with a custom designed harness 308, which allowed for precise placement of the nodal point of the camera 306 and lens 310. Custom software was also designed for the LX200R in order to control the pan and tilt positioning of the camera/lens 306/310. In order to address requirement (f), in tested embodiments of the present technique the HDR of most panoramic scenes was captured by setting the aperture of the camera 306 to a prescribed value which is based on the lens' 310 modulation transfer function (MTF) and a desired depth of field, but allowing the camera's auto-exposure to set the camera's shutter speed. As is well known in the art of photography, lenses have an optimal aperture setting at which they are sharpest and this optimal aperture setting is defined by the lens manufacturer's MTF specifications. In order to address requirement (g), in tested embodiments of the present technique an f11 aperture setting was used. This also maintained a reasonable depth of field.

Referring again to FIG. 3, tested embodiments of the camera system 300 discussed heretofore were able to successfully capture various sets of images depicting various panoramic scenes at a rate of approximately 5 seconds per captured image when using a 400 mm lens 310. The various panoramic scenes had various field of view perspectives. The various sets of captured images contained between 250 and 800 images and were captured over time spans ranging between 30 and 90 minutes. The overall size of these sets of captured images ranged from 1.2 gigapixels to 4.5 gigapixels. It is noted that the present technique is capable of capturing, processing and assembling sets of images that are both smaller and larger than this, both in image count and overall size.

Referring again to FIG. 3, in tested embodiments of the camera system 300 the captured images were stored by the camera 306 in 16-bit per pixel raw data format. In tested embodiments of the present technique a 16% overlap was used between adjacent images. A script was developed which generates a particular sequence of prescribed pan and tilt angles for the camera 306. The motorized head 302 then used this script to individually capture the set of images depicting a particular panoramic scene. The images were captured by panning the scene in vertical scan-line order in order to minimize the time variant characteristics between adjacent images in the vertical direction in a typical scene such as illumination changes and moving elements within the scene. However, as described heretofore, in other embodiments of the present technique the images can be captured by panning the scene in horizontal scan-line order as necessary for certain types of scenes.

2.2 Processing and Assembling Captured Images into Gigapixel Image

This section describes embodiments of procedures, according to the present technique for generating gigapixel images, used to process the aforementioned set of individually captured images and subsequently assemble the processed images into a seamless, composite gigapixel image that depicts the panoramic scene in its entirety (refer to FIG. 2, stage 202). Several challenges must be overcome in order to efficiently create a seamless, composite, gigapixel image from a large set of individually captured high resolution images of a panoramic scene that has HDR. By way of example, but not limitation, images in a set will often have widely varying exposures which can make it difficult to construct a seamless composite image from the set. Therefore, the image processing and assembly procedures should be robust to large exposure differences in the images while at the same time preserving the HDR of the images. By way of further example, a set of images captured for a panoramic scene with a large field of view perspective can consist of many hundreds of images. Therefore, the image processing and assembly procedures should also be automated for optimal efficiency. By way of yet further example, as discussed heretofore, misregistrations will often exist between images in a set due to a number of different factors such as motion of an element(s) in the scene, vibration of the camera system, degrees of uncertainty in the tilt and pan positioning of the camera/lens and the focal length of the camera/lens (discussed in more detail hereafter), and parallax. These misregistrations result in overlapping pixels between adjacent images that do not correspond to the same point in the scene. The present technique addresses these challenges and problems.

Figure 4:
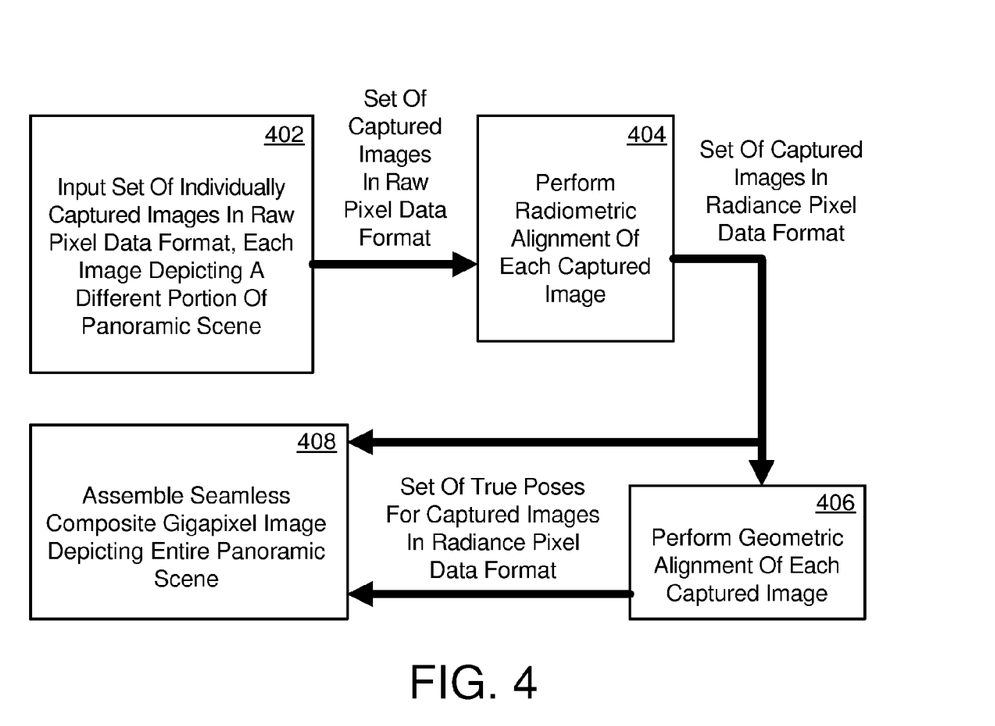
FIG. 4 shows a flow diagram of an exemplary embodiment of four phases generally involved in processing the set of images depicting a panoramic scene and assembling the processed images into a composite gigapixel image that depicts the entire panoramic scene according to the present technique.

As shown in FIG. 4, in an embodiment of the present technique for generating gigapixel images, the aforementioned stage of processing and assembling the set of individually captured images (refer to FIG. 2, stage 202) generally involves four phases. The first phase generally involves inputting the set of individually captured images from the camera in their aforementioned raw pixel data format, each image depicting a different portion of a panoramic scene 402. It is noted that the image data that is input in this phase 402 also includes other associated image capture parameters such as an exposure time for each image in the set. The second phase generally involves performing radiometric alignment of each captured image 404, resulting in the creation of a set of captured images in radiance pixel data format. The third phase generally involves performing geometric alignment of each captured image 406. It is noted that this geometric alignment is performed in the radiance data space. This phase 406 results in the creation of a set of true poses for the captured images in radiance pixel data format. The forth phase generally involves assembling a seamless, composite gigapixel image that depicts the panoramic scene in its entirety from the set of captured images in their radiance pixel data format and the set of true poses for the captured images in their radiance pixel data format 408. These four phases will now be described in detail.

2.2.1 Radiometric Alignment of Individual Images

Figure 5:
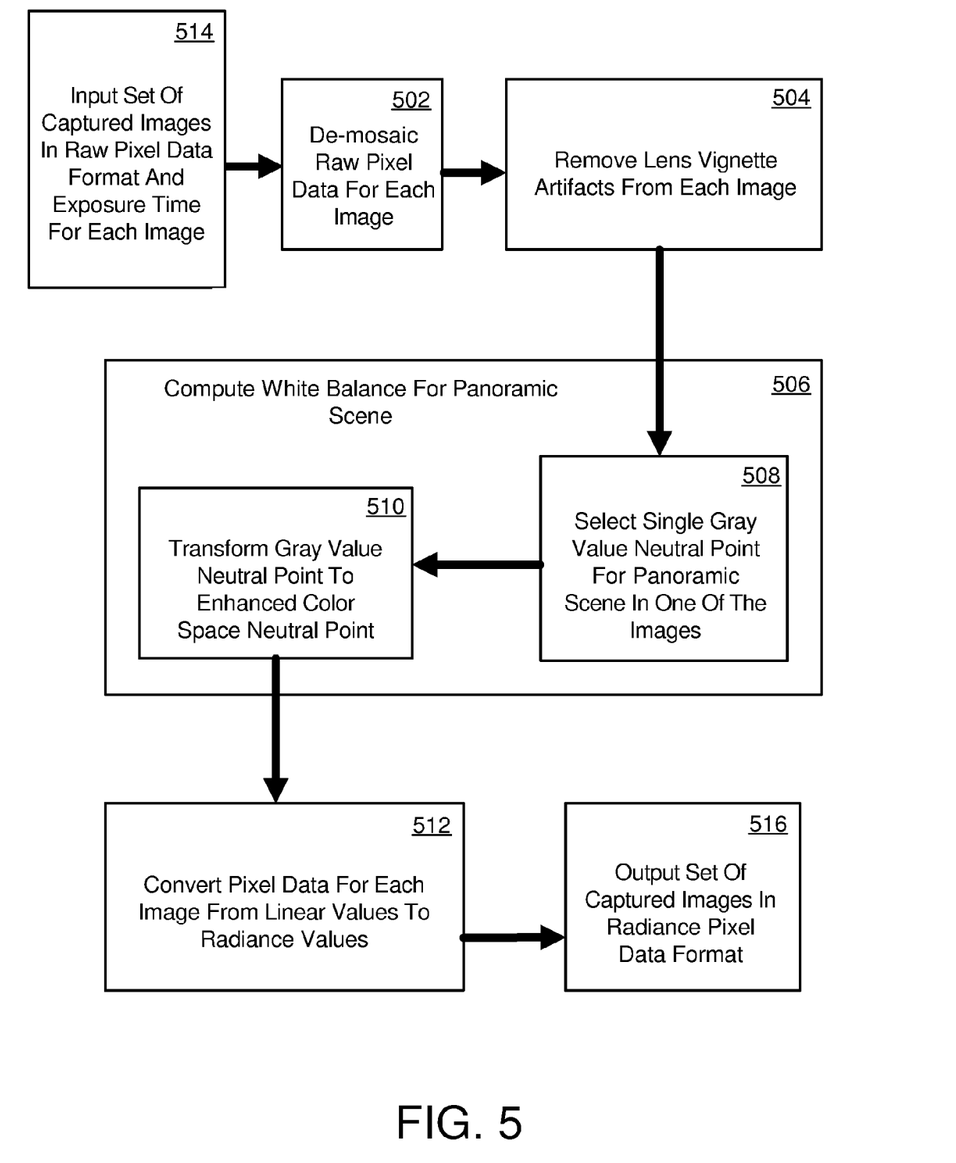
FIG. 5 shows a flow diagram of an exemplary embodiment of the actions involved in performing radiometric alignment of each captured image according to the present technique.

FIG. 5 illustrates the aforementioned second phase of performing radiometric alignment of each of the captured images in one embodiment of the present technique. This phase begins by inputting the set of captured images in their raw pixel data format along with an exposure time for each captured image in the set 514. It is noted that this raw pixel data format consists of linear data values. As is well known in the art of digital photography, different digital cameras generally support different native raw pixel data storage formats. In the case of the aforementioned two different Canon cameras which were used in tested embodiments of the present technique to individually capture sets of images depicting panoramic scenes, the camera stores the raw pixel data in Canon's CR2 format. In tested embodiments of the present technique the raw pixel data for the captured images was converted from CR2 format to standard Digital Negative (DNG) format during action 514. The raw pixel data for each captured image is then de-mosaiced 502 resulting in the conversion from raw pixel data to color pixel data. Any appropriate technique can be used to perform this de-mosaicing. In tested embodiments of the present technique the raw pixel data for each image is de-mosaiced using a high-quality gradient-corrected linear interpolation technique described in a co-pending U.S. patent application Ser. No. 10/801,450, filed Mar. 15, 2004, which has the assignee in common with the present application.

Referring again to FIG. 5, lens vignette artifacts (i.e. degradation in image intensity due to the lens) are removed from each captured image 504 by multiplying the pixels for each image with a vignette adjustment map. This map can be generated for the particular lens and aperture setting by using the camera system to capture an image of a very uniform light field which is generated by an integrating sphere. The white balance for the panoramic scene is then computed 506 by first selecting a single gray value neutral point for the panoramic scene in one of the images 508. The gray value neutral point is a single pixel in the scene that is void of color but not black (i.e. the pixel could be white or gray) and is used to define the color balance for the entire scene. The gray value neutral point is then transformed to an scRGB neutral point (also herein referred to as an enhanced color space neutral point) 510. As is known in the art of photographic color management, scRGB is a new industry standard color space that generally compliments and extends the sRGB color space by offering enhancements such as supporting a larger color gamut and larger dynamic range. It is noted that any appropriate transform technique can be used. In tested embodiments of the present technique the Bradford chromatic adaptation technique was used to transform the gray value neutral point to an enhanced color space neutral point. Next, the pixel data for each captured image is converted from linear data values to radiance data values 512 on a pixel by pixel basis by dividing the pixel data by the exposure time for the image. In tested embodiments of the present technique the exposure time is defined as the shutter speed of the camera, which as discussed heretofore is recorded by the camera for each captured image. This conversion serves to normalize the exposure of the images and results in the creation of floating point images. The second phase 404 concludes by outputting the set of captured images in their radiance pixel data format 516.

2.2.2 Geometric Alignment of Individual Images

Referring again to FIG. 3, even though the aforementioned camera system 300 provides precise positioning of the camera 306 and lens 310 when individually capturing each image, the positioning provided by the camera system is not accurate enough to use as the true pose for each image. Uncertainty in the pose comes from several factors including, but not limited to, the following. When the harness 308 is mounted to the U-shaped assembly 312, and when the U-shaped assembly is mounted to the motorized head 302, there is an unknown degree of rotation, along the X and Y axes and also along a Z axis (not shown) which runs perpendicular to both the X and Y axes, between the camera 306 and motorized head. This degree of uncertainty in the camera's 306 particular tilt positioning about the X axis and pan positioning about the Y axis is greater than the angular spacing of a pixel captured by the camera. Additionally, the focal length of the camera/lens 306/310 is not known to the desired degree of precision. Thus, each image captured by the camera system 300 contains only an approximate pose. Therefore, geometric alignment of each image must be performed in order to compute the true pose for each image.

Figure 6:
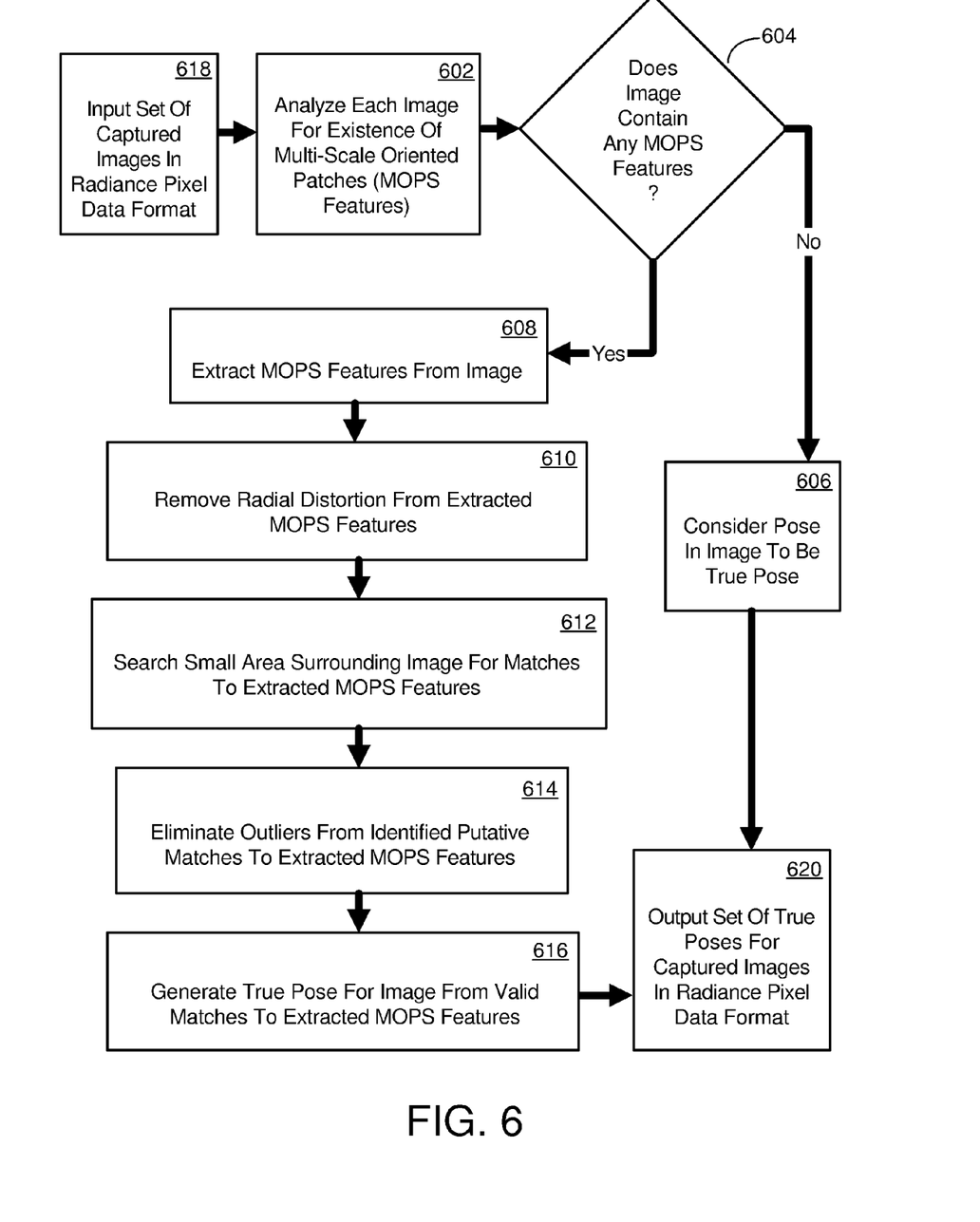
FIG. 6 shows a flow diagram of an exemplary embodiment of the actions involved in performing geometric alignment of each captured image according to the present technique.

FIG. 6 illustrates the aforementioned third phase of performing geometric alignment of each of the captured images in one embodiment of the present technique. In general, this phase is implemented using a feature-based alignment technique which is tolerant to exposure differences. This alignment technique will now be described in more detail. This phase begins by inputting the set of captured images in their radiance pixel data format 618. Each captured image is then analyzed for the existence of particular invariant features known in the art as multi-scale oriented patches (hereafter referred to as MOPS features) 602. For each particular captured image which does not contain any MOPS features 604, the pose in the particular image is considered to be a true pose 606.

Referring again to FIG. 6, for each particular captured image which does contain MOPS features 604, the particular MOPS features contained therein are extracted from the particular image 608. Radial distortion is then removed from the extracted MOPS features 610 by mapping the extracted features through the aforementioned pre-characterization of radial distortion associated with the particular lens used to capture the image. A small area surrounding the image is then searched for matches to the particular MOPS features extracted from the image 612, resulting in the identification of putative matches to the extracted MOPS features. This small area includes a small segment of each of up to eight other images that are adjacent to and overlap the particular image, and the up to eight small segments have a common width which is prescribed based on the known pan and tilt positioning tolerances of the camera system. Outliers are then eliminated from the identified putative matches to the extracted MOPS features 614 using a random sample consensus (RANSAC) technique, resulting in the identification of valid matches to the extracted MOPS features. The true pose for the particular image is then generated from the valid matches to the extracted MOPS features 616 using a bundle adjustment technique. It is noted that this bundle adjustment technique is carefully designed to take into consideration the fact that the set of images captured for a panoramic scene can contain a large number of images and hence, can contain an even larger number of extracted MOPS features. The third phase 406 concludes by outputting a set of true poses for the captured images in their radiance pixel data format 620.

Figure 7:
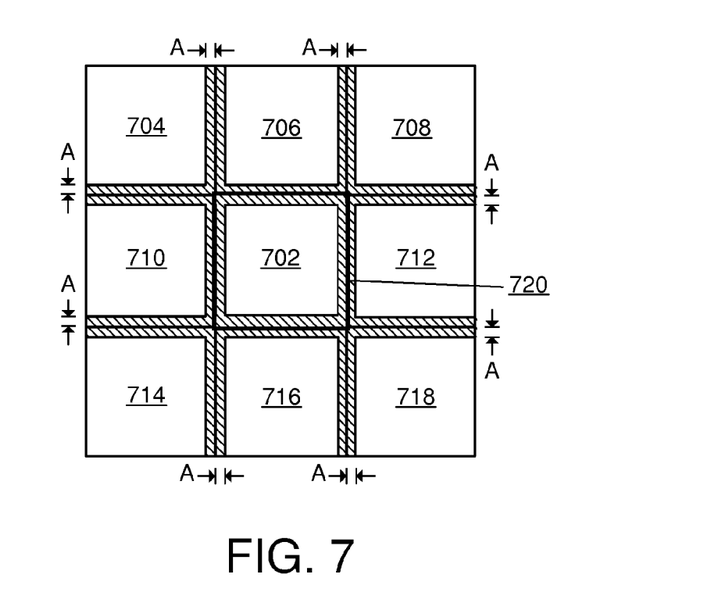
FIG. 7 shows a diagram of an exemplary small area surrounding an exemplary image which contains multi-scale oriented patches (MOPS features) and which is searched in order to identify matches to the MOPS features according to the present technique.

FIG. 7 shows a diagram of the aforementioned small area surrounding an exemplary image under consideration. More particularly, FIG. 7 shows an exemplary image under consideration 702 and eight images 704, 706, 708, 710, 712, 714, 716 and 718 which are adjacent to and overlap the image under consideration. Each of these nine total images overlaps its neighboring images by a common prescribed amount A. FIG. 7 element 720 represents the small area surrounding the image under consideration 702. By way of example but not limitation, it is noted that in the case where the image under consideration resides in a corner of the panoramic scene (not shown), three images would be adjacent to and overlap the image under consideration, and the small area would not surround the image under consideration but rather would border it on only two adjacent sides. By way of further example, it is noted that in the case where the image under consideration resides on an edge of the panoramic scene but not in a corner (not shown), five images would be adjacent to and overlap the image under consideration, and the small area would also not surround the image under consideration but rather would border it on only three adjacent sides.

2.2.3 Assembly of Individual Images into Gigapixel Image

Figure 8A:
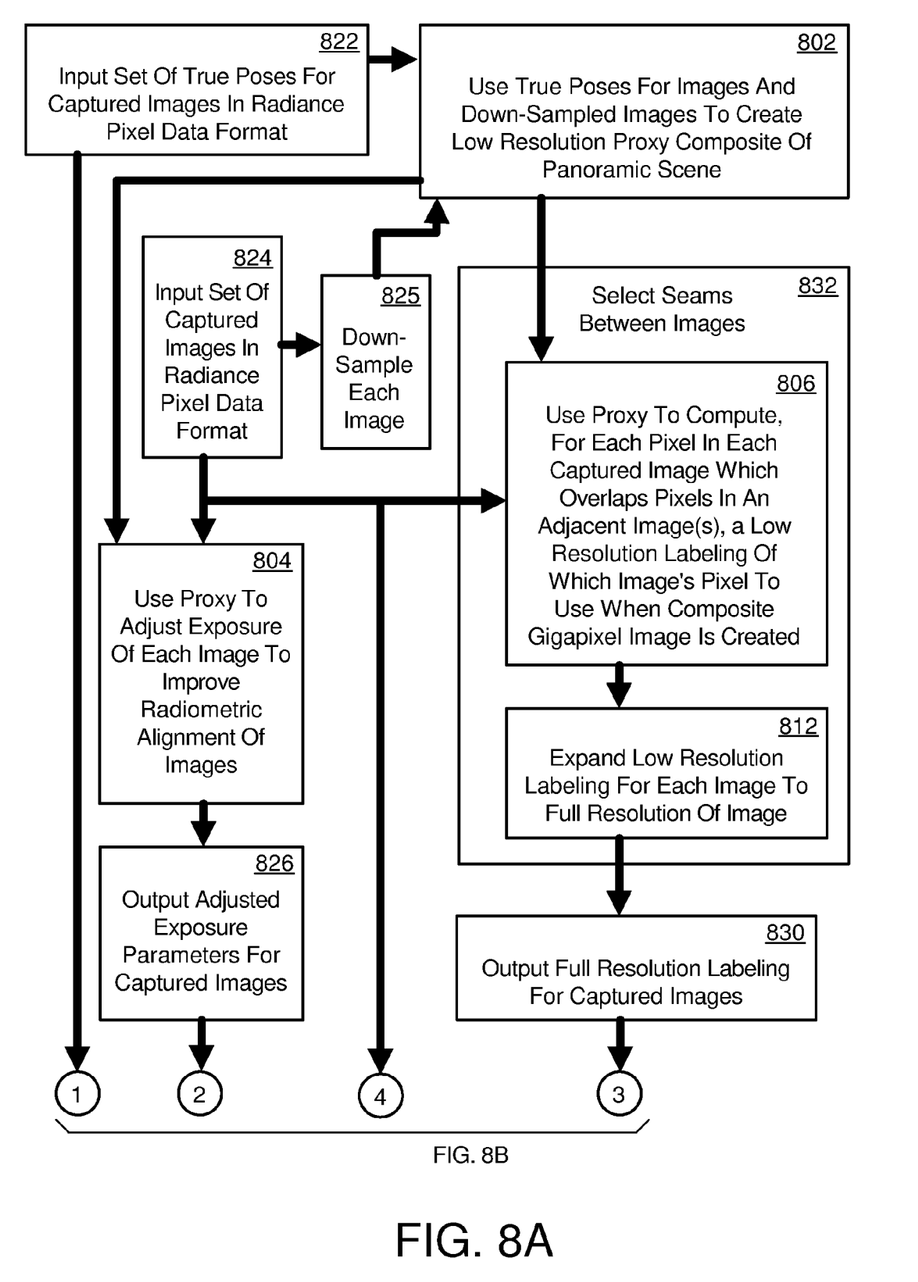
FIGS. 8A and 8B show a flow diagram of an exemplary embodiment of the actions involved in assembling the processed captured images into a composite gigapixel image that depicts the panoramic scene in its entirety according to the present technique.
Figure 8B:
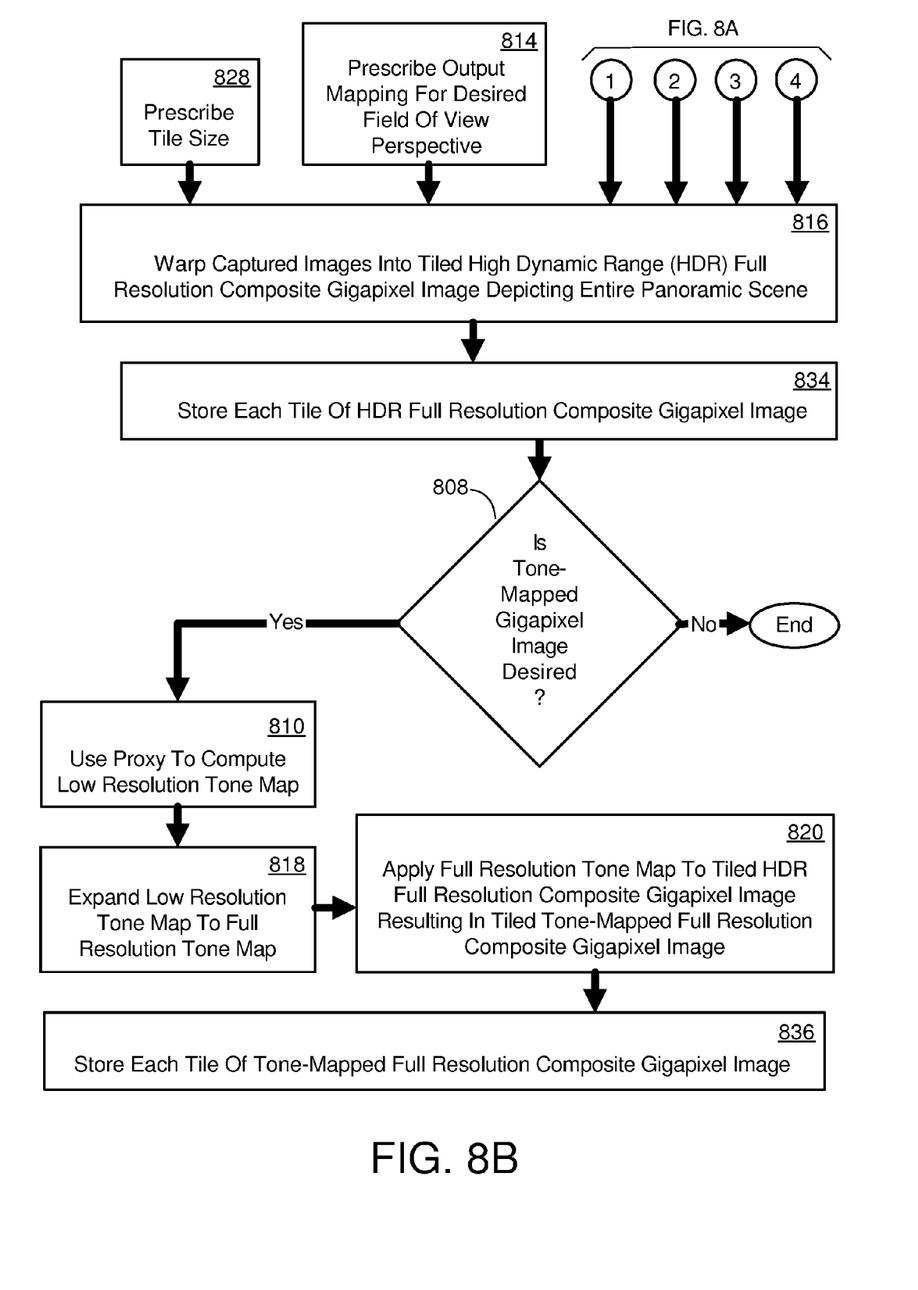

FIGS. 8A and 8B illustrate the aforementioned fourth phase of using the set of captured images in their radiance pixel data format, along with the set of true poses for the captured images in their radiance pixel data format, to assemble a seamless, composite gigapixel image that depicts the panoramic scene in its entirety in one embodiment of the present technique. As shown in FIG. 8A, this phase begins by inputting the set of true poses for the captured images in their radiance pixel data format 822 and inputting the set of captured images in their radiance pixel data format 824. Each captured image is first down-sampled 825. The true poses for the captured images and the down-sampled captured images are then used to create a low resolution proxy composite of the panoramic scene 802. This proxy is used for several actions associated with analyzing the set of captured images, each action being described hereafter. It is noted that these actions would not be tractable on the full resolution composite. It is also noted that this proxy covers the entire field of view perspective spanned by the panoramic scene.

Referring again to FIG. 8A, the aforementioned low resolution proxy composite of the panoramic scene is used to adjust the exposure of each captured image in order to improve the radiometric alignment of the captured images 804, resulting in the creation of an adjusted exposure parameter for each captured image 826. The adjusted exposure parameter for each captured image makes the radiance pixel data values in portions of the image which overlap other images match the overlapping radiance pixel data values in the other images. It is noted that simply dividing the raw pixel data for each captured image by the camera shutter speed used to capture the image as described heretofore only generates approximately matching radiance pixel data values between overlapping images due to slight errors in the shutter speeds reported by the camera coupled with minor illumination changes across the panoramic scene. Any appropriate technique can be used to perform this exposure adjustment. In tested embodiments of the present technique the exposure of each image is adjusted using a per color channel gain computation technique described in U.S. Pat. No. 7,239,805, which has the assignee in common with the present application and also has an inventor in common with the present application.

Referring again to FIG. 8A, the aforementioned low resolution proxy composite of the panoramic scene is also used to select seams between the captured images 832 by first computing, for each pixel in each captured image which overlaps pixels in an adjacent image(s), a low resolution labeling of which image's pixel to use when the composite gigapixel image is created 806. In tested embodiments of the present technique this computation is performed using a conventional graph-cut seam selection technique applied to the radiance data space. It is noted that even the proxy composite represents a very large graph. However, this issue is ameliorated by the aforementioned fact that the graph-cut scene selection technique is iteratively applied to each captured image. Thus, in action 806 the largest graph created is only the size of one captured image and the graph-cut iteration only operates on the low resolution labeling that includes the current captured image and the overlapping regions of its up to eight neighboring images as shown in FIG. 7. It is noted that this seam selection technique 832 insures that seams between the overlapping images are as invisible as possible when the composite gigapixel image is created by placing the seams between the overlapping images in areas where there is good agreement between the images. It is also noted that no blending is required on the overlapping images since their exposures were previously adjusted in actions 804 and 826 as described heretofore. This is advantageous since the use of blending for sets of images which have varying exposures results in poor tone mapping.

Referring again to FIG. 8A, the aforementioned low resolution labeling for each captured image is then expanded to the full resolution of the image 812, resulting in a full resolution labeling for each captured image 830. In tested embodiments of the present technique this expansion is performed using a joint bilateral up-sampling technique described in a co-pending U.S. patent application Ser. No. 11/742,325, filed Apr. 30, 2007, which has the assignee in common with the present application and also has inventors in common with the present application. It is noted that other techniques could be employed as well, however, the use of this particular technique minimizes the computer processing and related time required to perform the expansion and hence, optimizes the efficiency of the expansion.

A seamless, composite gigapixel image that depicts the panoramic scene in its entirety can now be assembled. As shown in FIGS. 8A and 8B, the aforementioned set of captured images in their radiance pixel data format 824, the aforementioned set of true poses for the captured images in their radiance pixel data format 822, the aforementioned adjusted exposure parameters for the captured images 826, the aforementioned full resolution labeling for the captured images 830, a prescribed output mapping for a desired field of view 814, and a prescribed tile size 828 are used to warp the captured images into a tiled, HDR, full resolution, composite gigapixel image that depicts the panoramic scene in its entirety 816. By way of example, but not limitation, action 814 could prescribe a perspective projection, or a cylindrical projection for a larger field of view, or a spherical projection for an even larger field of view. In tested embodiments of the present technique the warping is performed in a single action, as opposed to separate actions in order to avoid more than one re-sampling of the captured images which can result in degradation in the quality of the gigapixel image. Furthermore, in tested embodiments of the present technique a 256 pixel×256 pixel tile size was used. Each tile of the HDR, full resolution, composite gigapixel image is then stored 834 in a prescribed file format. In tested embodiments of the present technique these HDR tiles are stored as 128-bit floating point data in HD Photo file format. The gigapixel image is stored in a tiled pyramid, meaning that a representation of the image is stored in its native resolution, in half-resolution, in quarter-resolution and so on. The pyramid is generated using the lossless compression feature of the HD Photo format in order to avoid successive compression/decompression during the required processing.

The tiled HDR full resolution composite gigapixel image can be optionally tone mapped in order to convert the HDR gigapixel image to 24-bit RGB format, thus creating a displayable image. In one embodiment of the present technique this conversion is performed as follows. Referring again to FIG. 8B, when a tone-mapped gigapixel image is desired 808, the aforementioned low resolution proxy composite of the panoramic scene is used to compute a low resolution tone map 810. This computation can be performed using any conventional tone mapper. In tested embodiments of the present technique the low resolution tone map is computed using an interactive local adjustment of tonal values technique. The low resolution tone map is then expanded to a full resolution tone map 818. In general, this expansion should be performed using the same technique used to expand the resolution of the label set for each captured image. As such, in tested embodiments of the present technique the low resolution tone map is expanded using the aforementioned joint bilateral up-sampling technique. The full resolution tone map is then applied to the HDR, full resolution, composite gigapixel image resulting in the creation of a tiled, tone-mapped, full resolution, composite gigapixel image 820, and each tile is subsequently stored 836 in a prescribed file format. In tested embodiments of the present technique these tone-mapped tiles are stored as a 24-bit RGB data in HD Photo file format.

2.2.4 Program Module Architecture

Figure 9:
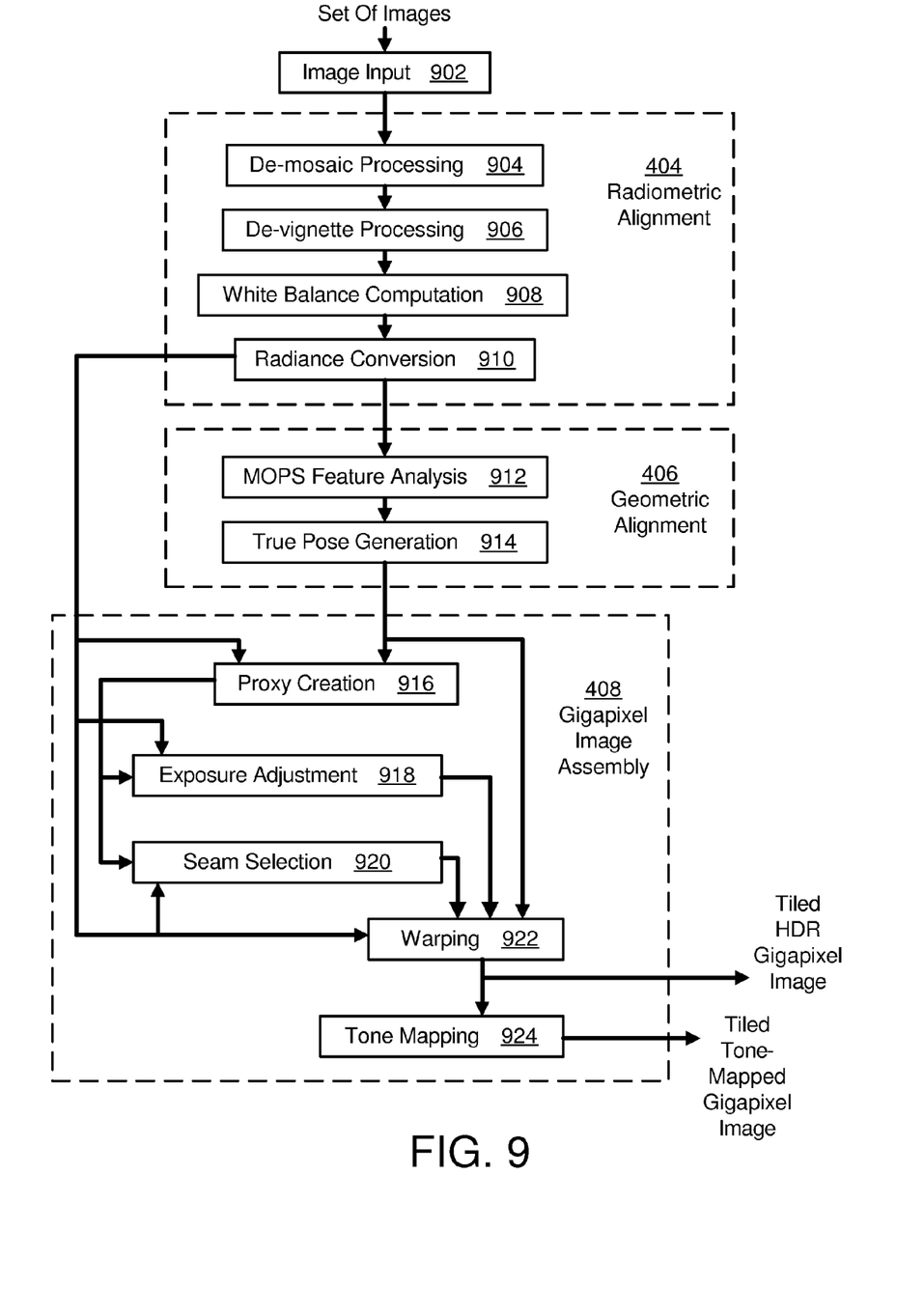
FIG. 9 shows a diagram of a general computing system program module architecture for an exemplary embodiment of the present technique.

FIG. 9 shows an embodiment of a computing system program module architecture, in simplified form, according to the present technique, used to process the aforementioned set of individually captured images and subsequently assemble the processed images into a seamless, composite gigapixel image that depicts the panoramic scene in its entirety (refer to FIG. 2, stage 202). An image input module 902 first inputs the set of individually captured images into the computing system in a raw pixel data format which consists of linear data values. A de-mosaic processing module 904 then de-mosaics the set of captured images, resulting in their conversion from raw pixel data to color pixel data. A de-vignette processing module 906 then removes the lens vignette artifacts from the de-mosaiced images. A white balance computation module 908 then computes the white balance for the panoramic scene, and a radiance conversion module 910 converts the pixel data for the de-vignetted images from linear data values to radiance data values. Program modules 904, 906, 908 and 910 generally make up the aforementioned second phase of performing radiometric alignment of each captured image (refer to FIG. 4, phase 404).

Referring again to FIG. 9, a MOPS feature analysis module 912 analyzes the converted images for the existence of MOPS features. A true pose generation module 914 then generates true poses for the converted images using identified MOPS features. Program modules 912 and 914 generally make up the aforementioned third phase of performing geometric alignment of each captured image (refer to FIG. 4, phase 406).

Referring again to FIG. 9, a proxy creation module 916 first down-samples the converted images, and then uses the true poses for the converted images and the down-sampled converted images to create a low resolution proxy composite of the panoramic scene. An exposure adjustment module 918 then uses the proxy to adjust the exposure of the converted images, resulting in a set of adjusted exposure parameters for the converted images. A seam selection module 920 also uses the proxy to select seams between the converted images and compute a full resolution labeling for each converted image of which pixels, residing in portions of the image that overlap other images, to use in creating the gigapixel image. A warping module 922 then generates a tiled, HDR, full resolution, composite gigapixel image from the converted images, the true poses for the converted images, the set of adjusted exposure parameters for the converted images, the full resolution labeling for each converted image, a prescribed output mapping for a desired field of view perspective, and a prescribed tile size. Whenever it is determined that a tone-mapped gigapixel image is desired, a tone mapping module 924 also uses the proxy to compute a full resolution tone map and then apply this tone map to the tiled, HDR, full resolution, composite gigapixel image resulting in a tiled, tone-mapped, full resolution, composite gigapixel image. Program modules 916, 918, 920, 922 and 924 generally make up the aforementioned fourth phase of assembling a seamless, composite gigapixel image that depicts the panoramic scene in its entirety (refer to FIG. 4, phase 408).

3.0 Additional Embodiments

While the present technique has been described in detail by specific reference to embodiments thereof, it is understood that variations and modifications thereof may be made without departing from the true spirit and scope of the present technique. It is noted that any or all of the aforementioned embodiments may be used in any combination desired to form additional hybrid embodiments. Further, although the present technique has been described in language specific to structural features and/or methodological acts, it is noted that the subject matter defined in the appended claims is not necessarily limited to the specific features or acts described heretofore. Rather, the specific features and acts described heretofore are disclosed as example forms of implementing the claims.

Wherefore, what is claimed is:

1. A computer-implemented process for generating a gigapixel image, comprising using a computing device to perform the following process actions:
   inputting a set of images, wherein the set of images comprises a plurality of captured images in raw pixel data format, each of which depicts a portion of an overall panoramic scene with an amount of overlap between images that depict adjacent portions of the scene;
   performing radiometric alignment of each captured image, resulting in the creation of a set of captured images in radiance pixel data format;
   performing geometric alignment of each captured image in its radiance pixel data format, resulting in the creation of a set of true poses for the captured images in radiance pixel data format; and
   assembling a seamless gigapixel image from the set of captured images in radiance pixel data format and the set of true poses for the captured images in radiance pixel data format.

2. The process of claim 1, wherein the captured images are individually captured at a plurality of exposures.

3. The process of claim 2, wherein the set of images further comprises exposure time information for each captured image in the set, the raw pixel data format comprises linear data values, and the process action of performing radiometric alignment of each captured image comprises the actions of:
   de-mosaicing the raw pixel data for each captured image, resulting in the conversion from raw pixel data to color pixel data;
   removing lens vignette artifacts from each captured image by multiplying the pixels for each image with a vignette adjustment map;
   computing white balance for the panoramic scene; and
   converting the pixel data for each captured image from linear data values to radiance data values by dividing the pixel data by the exposure time for the image.

4. The process of claim 3, wherein the process action of de-mosaicing the raw pixel data for each captured image comprises employing a high-quality gradient-corrected linear interpolation technique.

5. The process of claim 3, wherein,
   the vignette adjustment map is generated for a particular lens and aperture setting of a camera system used to capture the set of images by using said camera system to capture an image of a very uniform light field, and
   the exposure time for the image is defined as a particular shutter speed of a camera system used to capture that image.

6. The process of claim 3, wherein the process action of computing white balance for the panoramic scene comprises the actions of:
   selecting a single gray value neutral point for the scene in one of the captured images; and
   transforming the gray value neutral point to an enhanced color space neutral point, wherein the gray value neutral point comprises a single pixel in the scene that is void of color but not black.

7. The process of claim 6, wherein the process action of transforming the gray value neutral point to an enhanced color space neutral point comprises transforming the gray value neutral point to an scRGB neutral point using a Bradford chromatic adaptation technique.

8. The process of claim 2, wherein the process action of performing geometric alignment of each captured image in its radiance pixel data format comprises the actions of:
   analyzing each captured image for the existence of multi-scale oriented patches (MOPS) features;
   whenever it is determined a particular captured image does not contain any MOPS features, considering the pose in said image to be a true pose; and
   whenever it is determined a particular captured image does contain particular MOPS features,
      extracting the particular MOPS features from said image,
      removing radial distortion from the extracted MOPS features by mapping the extracted features through a pre-characterization of radial distortion associated with a particular lens of a camera system used to capture the set of images,
      searching a small area surrounding said image for matches to the extracted MOPS features, resulting in the identification of putative matches to the extracted MOPS features, wherein said small area comprises a small segment of each of the up to eight other captured images that overlap said image,
eliminating outliers from the putative matches, resulting in the identification of valid matches to the extracted MOPS feature, and
generating a true pose for said image from the valid matches to the extracted MOPS features.

9. The process of claim 8, wherein,
the process action of eliminating outliers from the identified putative matches to the extracted MOPS features comprises an action of employing a random sample consensus technique, and
the process action of generating a true pose for said image from the valid matches to the extracted MOPS features comprises an action of employing a bundle adjustment technique which is designed to accommodate a large number of images.

10. The process of claim 2, wherein the process action of assembling a seamless gigapixel image comprises the actions of:
down-sampling each captured image in radiance pixel data format;
using the down-sampled images and the true poses for the captured images to create a low resolution proxy composite of the panoramic scene;
using the proxy composite to adjust the exposure of each captured image to improve the radiometric alignment of the captured images, resulting in an adjusted exposure parameter for each captured image;
using the proxy composite to select seams between the captured images and compute, for each pixel in each captured image which overlaps pixels in an adjacent image(s), a low resolution labeling of which image's pixel to use in creating the composite gigapixel image;
generating a full resolution labeling for each captured image by expanding the low resolution labeling associated therewith;
using the set of captured images in radiance pixel data format, the set of true poses for the captured images in radiance pixel data format, the adjusted exposure parameter for each captured image, the full resolution labeling for each captured image, a prescribed output mapping for a desired field of view perspective, and a prescribed tile size to warp the captured images into a tiled, high dynamic range (HDR), full resolution, composite gigapixel image that depicts the entire panoramic scene; and
storing each tile of the HDR, full resolution, composite gigapixel image in a prescribed file format.

11. The process of claim 10, wherein the process action of using the proxy composite to adjust the exposure of each captured image comprises an action of using a per color channel gain computation technique.

12. The process of claim 10, wherein the process action of using the proxy composite to select seams between the captured images and compute a low resolution labeling of which image's pixel to use in creating the composite gigapixel image comprises an action of using a graph-cut seam selection technique which is iteratively applied to each image.

13. The process of claim 10, wherein the process action of generating a full resolution labeling for each captured image by expanding the low resolution labeling associated therewith comprises a process action of using a joint bilateral up-sampling technique to perform the expansion.

14. The process of claim 10, wherein the desired field of view defines one of an perspective projection, a cylindrical projection, or a spherical projection.

15. The process of claim 10, wherein,
the process action of warping of the captured images into a tiled, HDR, full resolution, composite gigapixel image is performed in a single action so that the captured images are re-sampled only once, and
the prescribed file format comprises 128-bit floating point data in HD Photo file format using the lossless compression feature of the HD Photo format.

16. The process of claim 10, wherein whenever a tone-mapped gigapixel image is desired, the process action of assembling a seamless gigapixel image further comprises the actions of:
using the proxy composite to compute a low resolution tone map;
expanding the low resolution tone map to a full resolution tone map;
applying the full resolution tone map to the tiled, HDR, full resolution, composite gigapixel image resulting in the creation of a tile, tone-mapped, full resolution, composite gigapixel image; and
storing each tile of the tone-mapped, full resolution, composite gigapixel image in a prescribed file format.

17. The process of claim 16, wherein the process action of expanding the low resolution tone map to a full resolution tone map comprises an action of employing a joint bilateral up-sampling technique.

18. The process of claim 16, wherein,
the process action of using the proxy composite to compute a low resolution tone map comprises an action of using an interactive local adjustment of tonal values technique, and
the prescribed file format comprises 24-bit RGB data in HD Photo file format.

19. A system for generating a gigapixel image, comprising:
a general purpose computing device;
a computer program comprising program modules executable by the computing device, wherein the computing device is directed by the program modules to,
input a plurality of captured images in raw pixel data format, wherein,
each captured image depicts a different portion of a panoramic scene,
captured images that depict adjacent portions of the panoramic scene overlap each other by a common prescribed amount, and
the raw pixel data format comprises linear data values,
de-mosaic the captured images,
de-vignette the de-mosaiced images,
compute white balance for the panoramic scene,
convert the pixel data for the de-vignetted images from linear data values to radiance data values,
analyze the converted images for the existence of multi-scale oriented patches (MOPS) features,
generate true poses for the converted images using identified MOPS features,
down-sample the converted images,
use the down-sampled converted images and the true poses for the converted images to create a low resolution proxy composite of the panoramic scene,
use the proxy composite to,
adjust exposure of the converted images, resulting in a set of adjusted exposure parameters for the converted images, and select seams between the converted images and compute a full resolution labeling for each converted image of which pixels, residing in portions of the image that overlap other images, to use in creating the gigapixel image, and
generate a seamless, tiled, high dynamic range, full resolution, composite gigapixel image that depicts the entire panoramic scene from,
the converted images,
the true poses for the converted images,
the set of adjusted exposure parameters for the converted images,
the full resolution labeling for each converted image,
a prescribed output mapping for a desired field of view perspective, and
a prescribed tile size.

* * * * *